United States Patent
Sankar et al.

(10) Patent No.: US 9,848,403 B2
(45) Date of Patent: Dec. 19, 2017

(54) METHOD AND APPARATUS FOR WIRELESS NETWORK DATA COLLECTION

(71) Applicant: GOOGLE TECHNOLOGY HOLDINGS LLC, Mountain View, CA (US)

(72) Inventors: Vel Pratheesh Sankar, Libertyville, IL (US); Ghouse Adoni Mohammed, Folsom, CA (US); Craig J Detter, Gurnee, IL (US); Vidya Narayanan, San Jose, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 15/344,440

(22) Filed: Nov. 4, 2016

(65) Prior Publication Data

US 2017/0079004 A1    Mar. 16, 2017

Related U.S. Application Data

(62) Division of application No. 14/059,586, filed on Oct. 22, 2013, now Pat. No. 9,491,645.

(Continued)

(51) Int. Cl.
*H04W 4/00* (2009.01)
*H04W 64/00* (2009.01)
(Continued)

(52) U.S. Cl.
CPC .............. *H04W 64/00* (2013.01); *G01S 5/02* (2013.01); *H04L 43/065* (2013.01);
(Continued)

(58) Field of Classification Search
CPC ............................ H04W 24/08; H04L 43/065
(Continued)

(56) References Cited

U.S. PATENT DOCUMENTS 8,335,643 B2    12/2012  Vandivier et al.
8,391,884 B2     3/2013  Justusson et al.
(Continued)

FOREIGN PATENT DOCUMENTS

EP    2293017 A1    3/2011

OTHER PUBLICATIONS

International Preliminary Report on Patentability and Written Opinion for application PCT/US2014/049612, dated Feb. 18 2016.

(Continued)

*Primary Examiner* — Iqbal Zaidi
(74) *Attorney, Agent, or Firm* — Morris & Kamlay LLP

(57) ABSTRACT

A method on an electronic device for a wireless network is described. A first set of unique wireless access point IDs is collected. A second set of unique wireless access point IDs is collected. The first set and the second set are compared to determine intersecting wireless access point IDs and non-intersecting wireless access point IDs of the second set. If the number of intersecting wireless access point IDs meets an intersection threshold for the first set, the non-intersecting wireless access point IDs of the second set are added to the first set. A confidence level is updated for the unique wireless access point IDs of the first set that correspond to the intersecting wireless access point IDs. Geographic information is determined for the unique wireless access point IDs of the first set that meet a confidence threshold.

18 Claims, 4 Drawing Sheets

Related U.S. Application Data

(60) Provisional application No. 61/862,637, filed on Aug. 6, 2013.

(51) Int. Cl.
*H04L 12/26* (2006.01)
*H04W 24/08* (2009.01)
*G01S 5/02* (2010.01)
*H04W 52/02* (2009.01)

(52) U.S. Cl.
CPC ....... *H04W 24/08* (2013.01); *H04W 52/0209* (2013.01); *Y02B 60/50* (2013.01)

(58) Field of Classification Search
USPC .................. 370/328–468, 252–253; 455/529
See application file for complete search history.

(56) References Cited

U.S. PATENT DOCUMENTS

| | | | |
|---|---|---|---|
| 8,897,803 B2* | 11/2014 | Pylappan | H04W 4/02 455/456.1 |
| 2008/0025275 A1* | 1/2008 | Cheng | H04W 48/20 370/338 |
| 2010/0248740 A1 | 9/2010 | Justusson et al. | |
| 2011/0306360 A1 | 12/2011 | Alizadeh-Shabdiz et al. | |
| 2013/0072227 A1* | 3/2013 | Morgan | G01S 5/02 455/456.1 |

OTHER PUBLICATIONS

International Search Report and Written Opinion issued in corresponding application No. PCT/US2014/049612 dated Apr. 29, 2015.

Partial International Search Report issued in corresponding application No. PCT/US2014/049612 dated Feb. 16, 2015.

* cited by examiner

METHOD AND APPARATUS FOR WIRELESS NETWORK DATA COLLECTION

RELATED APPLICATION(S)

This application is a division of co-pending and commonly assigned U.S. patent application Ser. No. 14/059,586, filed on Oct. 22, 2013, which claims priority to U.S. Provisional Patent Application No. 61/862,637, filed on Aug. 6, 2013, the contents of which are hereby incorporated by reference herein.

TECHNICAL FIELD

The disclosure relates to wireless network data collection on an electronic device.

BACKGROUND

Electronic devices, such as smartphones, tablets, and other electronics, are often used with applications ("apps") that provide automated features to the user based on a location of the electronic device, such as a point of interest. For example, a user located in their home may wish to be notified by a loud ringtone when a call is received, while automatically silencing the ringtone when the user is located at their place of work. The smartphone may determine its location via the Global Positioning System (GPS) and provide the automated features based on the location. However, the smartphone typically increases its power consumption in order to use the GPS feature. This increased power consumption reduces the smartphone's battery life more quickly. The smartphone may also determine its location by scanning for wireless access point IDs for WiFi networks and performing a lookup on each wireless access point ID for known associated locations. However, frequent scanning and performing the lookup also typically increase the smartphone's power consumption and reduces the battery life more quickly.

BRIEF DESCRIPTION OF THE DRAWINGS

These and/or other embodiments will become apparent and more readily appreciated from the following description of the embodiments, taken in conjunction with the accompanying drawings of which.

DETAILED DESCRIPTION

Figure 1:
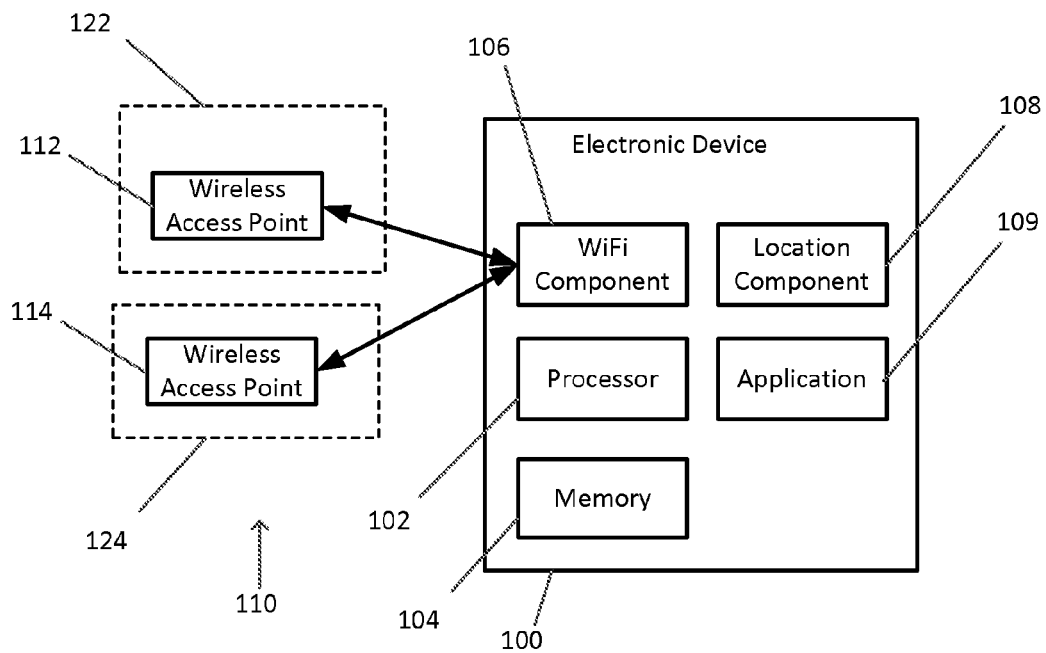
FIG. 1 is a block diagram illustrating an electronic device, according to an embodiment.

While several methods or technologies (e.g., GPS, WiFi, cell tower ID) may be available to a smartphone (or other electronic device) for determination of its location, it is desirable to efficiently use these methods to conserve the smartphone's battery life. A GPS component that determines the smartphone's location may provide high accuracy, but with significant power consumption. A cell tower ID may be used to determine the location with a low level of accuracy, but minimal power consumption as compared to typical operation of the smartphone. A WiFi-enabled smartphone may scan for wireless access point IDs for WiFi networks, which may then be used for determining the smartphone's location with moderate accuracy. However, each scan consumes additional power. The smartphone detects and collects wireless access point IDs during the scan, but must also perform a lookup (e.g., through Google Location Services) to determine a location that corresponds to each wireless access point ID. Once the location of the wireless access point associated with the wireless access point ID is determined, the smartphone may provide the automated features based on that location upon detection of the wireless access point ID.

The present disclosure is generally directed to a method and system for collecting wireless network data. In particular, the disclosure is directed to determining geographic information for wireless access points and associating selected wireless access points with points of interest.

The present disclosure describes a method. A first set of unique wireless access point IDs is collected. A second set of unique wireless access point IDs is collected. The first set and the second set are compared to determine intersecting wireless access point IDs and non-intersecting wireless access point IDs of the second set. If the number of intersecting wireless access point IDs meets an intersection threshold for the first set, the non-intersecting wireless access point IDs of the second set are added to the first set. A confidence level is updated for the unique wireless access point IDs of the first set that correspond to the intersecting wireless access point IDs. Geographic information is determined for the unique wireless access point IDs of the first set that meet a confidence threshold.

The present disclosure further describes a method. Data is collected regarding unique wireless access point IDs detected by the electronic device, the frequency with which the unique wireless access point IDs are detected, and the time of day at which the unique wireless access point IDs are detected. The collected data is compared with a set of criteria for a point of interest. A set of unique wireless access point IDs is associated with the point of interest based on the comparing step.

The present disclosure further describes an electronic device for a wireless network. The electronic device includes a non-transitory memory and a processor configured to retrieve instructions from the memory. The electronic device is configured to collect a first set of unique wireless access point IDs. The electronic device is configured to collect a second set of unique wireless access point IDs. The electronic device is configured to compare the first set and the second set to determine intersecting wireless access point IDs and non-intersecting wireless access point IDs of the second set. The electronic device is configured to add the non-intersecting wireless access point IDs of the second set to the first set if the number of intersecting wireless access point IDs meets an intersection threshold for the first set. The electronic device is configured to update a confidence level for the unique wireless access point IDs of the first set that correspond to the intersecting wireless access point IDs. The electronic device is configured to determine geographic information for the unique wireless access point IDs of the first set that meet a confidence threshold.

Turning to FIG. 1, an electronic device 100 is shown, according to an embodiment. The electronic device 100 includes a processor 102, a memory 104, a WiFi component 106, and a location component 108. The electronic device 100 may further include one or more user applications 109 (e.g., an "app"). The WiFi component 106 provides a wireless network capability to the electronic device 100, using one or more wireless access standards. In the embodiments described herein, the IEEE 802.11 standard is used. However, other wireless network standards may be used and will be apparent to those skilled in the art. The WiFi component 106 is configured to detect wireless access points ("WAPs"). The WiFi component 106 may be further configured to establish a communication channel with wireless access points for data communication.

The WiFi component 106 detects one or more wireless access points 110, for example, wireless access points 112 and 114. The wireless access points 110 may be identified by respective unique wireless access point IDs. Examples of the unique wireless access point ID may include a basic service set ID (BSSID), a media access control (MAC) address, an internet protocol (IP) address, another unique identifier, or any combination thereof. In one embodiment, the unique wireless access point ID is the BSSID because they are unique. Some wireless networks may cover a large geographical area through the use of many wireless access points. In this case, a single SSID or network name (e.g., "Free Public WiFi") may be available in multiple remote locations, making this network name a less accurate identifier for locations.

The wireless access points 112 and 114 are shown in FIG. 1 as wireless access points for wireless networks 122 and 124, respectively. In alternative embodiments, a wireless network may include multiple wireless access points, as will be apparent to those skilled in the art. The wireless networks 122 and 124 may be identified by a network identifier, such as a network name, a service set ID (SSID), an extended service set ID (ESSID), or any combination thereof.

The electronic device 100 is configured to initiate a scan for wireless access point data by the WiFi component 106. The wireless access point data may include unique wireless access point IDs, received signal strength indicators (RSSIs), network identifiers, or other information. The electronic device 100 in one example initiates the scan by an instruction from an operating system (not shown) of the electronic device 100. In another example, the electronic device 100 initiates the scan by an instruction from the user application 109 (e.g., a "Google Maps" app) executed by the electronic device 100. The electronic device 100 may execute a plurality of user applications 109 that initiate their own scan for unique wireless access point IDs. In yet another example, the location component 108 may initiate the scan, as described herein.

As a result of the scan, the WiFi component 106 may detect a set of unique wireless access point IDs. The WiFi component 106 may store the set of unique wireless access point IDs detected during a scan in the WiFi component 106, the memory 104, or a combination thereof. The WiFi component 106 may receive the detected unique wireless access point IDs in a message from the wireless access points 110, such as a beacon frame or other broadcast message. The WiFi component 106 may also actively message a preselected wireless access point, as in the case of a wireless access point that is configured to suppress the beaconing of its SSID. For example, a user may not wish to broadcast the SSID of their wireless network to reduce connection attempts by unauthorized users. In this case, the user may preselect the wireless access point and store its unique wireless access point ID so that during a scan, the WiFi component 106 messages the preselected wireless access point to determine its availability. The WiFi component 106 may detect the unique wireless access point ID based on a response to the message, as will be apparent to those skilled in the art. Accordingly, the electronic device 100 does not need to establish a communication channel with the wireless access point in order for the unique wireless access point ID to be detected.

The location component 108 is configured to collect and process wireless access point data, as described herein. The location component 108 may receive wireless access point data from the WiFi component 106 directly, from the memory 104, from the user application 109, or any combination thereof. Because the unique wireless access point IDs were detected during a single scan, it may be presumed that the corresponding wireless access points are near a same location. The location component 108 in one example stores records with unique wireless access point IDs that have been detected. The record may include the set of unique wireless access point ID and corresponding data, such as received signal strength indicators (RSSIs), detection times, detection durations, detection counts, confidence levels, location information, or other information. The location component 108 may be configured to determine a location for a point of interest ("POI") based on the records. The location component 108 may be further configured to determine when the electronic device 100 has arrived at or departed the point of interest. Examples of points of interest include a user's workplace, home, school, or other location. The location component 108 may create a point of interest based on collected data or preselected parameters (e.g., a time of day, day of the week, etc.). The point of interest may be used by the operating system of the electronic device 100 or the user applications 109, for example, via a "Smart Apps" feature.

The location component 108 is configured to obtain location information for a wireless access point. The location component 108 may use Google Location Services data or other external databases that correlate unique wireless access point IDs (e.g., BSSIDs) to geographical coordinates, a time zone, street address, zip code, other location information, or a combination thereof. The location component 108 may also determine a geographic proximity between at least two wireless access points based on a received signal strength indication for the wireless access points. For simplicity, the discussion herein may refer to location information for a unique wireless access point ID, which may be understood to mean the location information of the wireless access point that corresponds to the unique wireless access point ID.

Figure 2:
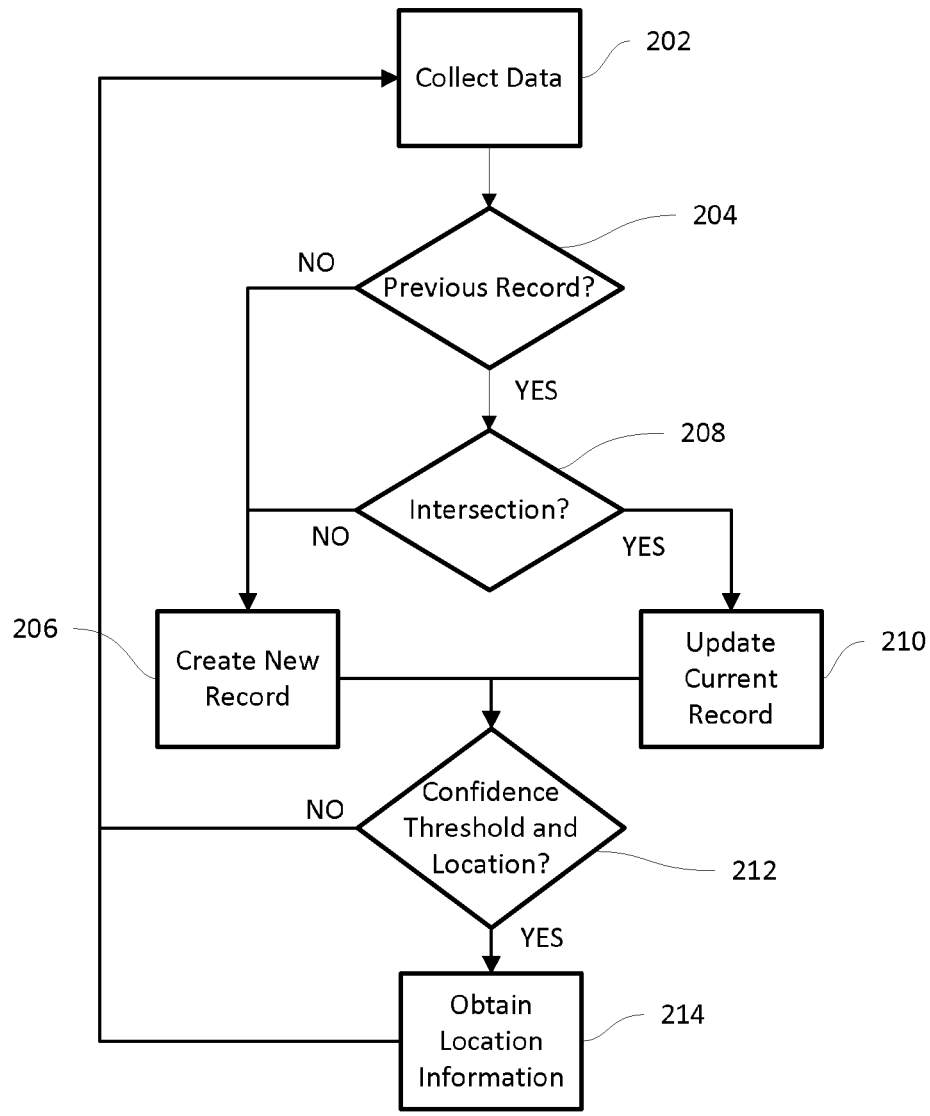
FIG. 2 is a flowchart of a method for collection of wireless access point data that may be performed by the electronic device of FIG. 1, according to an embodiment.

FIG. 2 is a flowchart of a method 200 for collection of wireless access point data that may be performed by the location component 108 of the electronic device 100, according to an embodiment. The location component 108 collects (202) wireless access point data. In one embodiment, the location component 108 waits for a scan by the WiFi component 106 to be initiated by the operating system, the user application 109, or other initiator. In this case, the location component 108 reduces a number of scans performed by the WiFi component 106, thus reducing power consumption. The location component 108 may also initiate the scan after an expiration of a timer. For example, the location component 108 may initiate the scan if a time since a previous scan meets a collection threshold. The collection threshold may be a fixed time period, such as fifteen minutes, or the location component 108 may dynamically adjust the collection threshold.

As a result of the scan, the location component 108 collects a set of unique wireless access point IDs ("collected set"). The location component 108 determines (204) whether a previous record of unique wireless access point IDs is available. If no previous record is available (NO at 204), the location component 108 creates (206) a new record for the set of unique wireless access point IDs.

If previous records are available (YES at 204), the location component 108 determines (208) whether the collected set intersects with a set of unique wireless access point IDs from a previous record ("record set"). For example, the location component 108 compares the collected set and the record set to determine intersecting wireless access point IDs and non-intersecting wireless access point IDs of the collected set. As one example, the collected set may include unique wireless access point IDs A, B, C, D, and E. The record set may include unique wireless access point IDs A, B, C, D, and X. In this example, unique wireless access point IDs A, B, C, and D are intersecting wireless access point IDs and unique wireless access point ID E is a non-intersecting wireless access point ID.

If the number of intersecting wireless access point IDs meets an intersection threshold for the record set (YES at 208), the location component 108 updates (210) the record set. For example, the location component 108 adds the non-intersecting wireless access point IDs ("E") to the record set. If the number of intersecting wireless access point IDs does not meet the intersection threshold (NO at 208), the location component 108 creates (206) a new record for the collected set. In an embodiment, the intersection threshold is a preselected percentage of a number of unique wireless access point IDs of the record set. With a preselected percentage of 80% and the previously described access point IDs as one example, the intersection threshold is 80% of five (for A, B, C, D, and X), which is four. Accordingly, the collected set intersects with the record set because four entries (A, B, C, and D) of the collected set match the record set. The use of a preselected percentage may reduce sensitivity to unique wireless access point IDs that are intermittently detected (e.g., due to low signal strength, being powered off, being moved, or part of a mobile access point within an automobile). In another embodiment, the intersection threshold is a fixed number (e.g., 1, 4, 5, etc.). The location component 108 in another embodiment uses a dynamic intersection threshold, for example, based on a confidence level of the record. In yet another embodiment, the location component 108 may use multiple intersection thresholds for determining intersection.

Upon creation of a new record, the location component 108 initializes a confidence level for the record. The confidence level may include a number of times that the unique wireless access point IDs within the record have been detected over a period of time (e.g., a detection count), a duration of time in which they have been detected (e.g., a detection time), a point value, or any combination thereof. The record may include an overall confidence level for the entire record, separate confidence levels for each unique wireless access point ID within the record, or both.

When updating (210) the record, the location component 108 updates the confidence levels based on the collected set. For example, where the confidence level is a detection count, the record may include a confidence level of 4, 5, 5, 4, and 3 for the unique wireless access point IDs A, B, C, D, and X, respectively. After the update, the record may include a confidence level of 5, 6, 6, 5, 1, and 3 for the unique wireless access point IDs A, B, C, D, E, and X, respectively.

In another embodiment, the confidence level may be an overall confidence level of 4 for the record set, such that after the update, the confidence level for the record set is 5.

In yet another embodiment, the confidence level may be a point value. The location component 108 may increase the point value based on a detection count or detection duration. The location component 108 may further increase the point value based on a time of day for the detection. For example, the point value may be increased by two points for each detection count during a predetermined "high value" time period and increased by one point for each detection count outside of the high value time period. The predetermined "high value" time period may be a time period likely to be associated with a point of interest, such as a user's workplace (e.g., 11:00 am to 2:00 pm) or home (e.g., 2:00 am to 4:00 am).

After creation of the new record (206) or updating (210), the location component 108 determines (212) whether a record has a confidence level that meets a confidence threshold and also whether the record includes location information. The confidence threshold may be a detection count, detection time, or a combination thereof. If no record has met the confidence threshold (NO at 212), the location component 108 resumes collecting data (202). If a record has met the confidence threshold but already has location information (NO at 212), the location component 108 resumes collecting data (202). If a record meets the confidence threshold and does not have location information (YES at 212), the location component 108 obtains (214) location information for the record, as described above.

Determining (212) whether the record meets the confidence threshold or obtaining the location information may be performed at later times. The location component 108 in one example waits to perform these steps to reduce a drain on a battery of the electronic device 100. For example, the location component 108 may wait for the electronic device 100 to be plugged into a source of electrical power or coupled with a high speed network (e.g., to reduce a transfer time for obtaining the location information).

Figure 3:
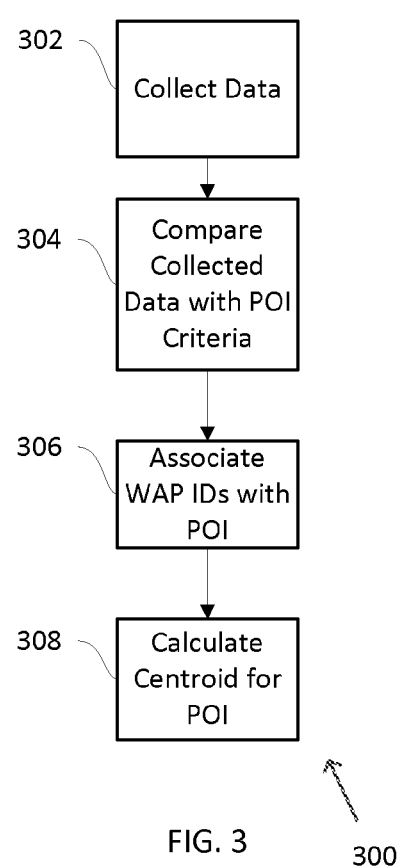
FIG. 3 is a flowchart of a method for determination of points of interest that may be performed by the electronic device of FIG. 1, according to an embodiment.

FIG. 3 is a flowchart of a method for determination of points of interest that may be performed by the location component 108 of the electronic device 100, according to an embodiment. The location component 108 collects (302) wireless access point data, for example, as described above with reference to FIG. 2. The location component 108 compares (304) the collected data (e.g., the records) with a set of criteria for a point of interest. The set of criteria may include at least one of a time range, detection count, a geographic distance, or others, as will be apparent to those skilled in the art. The location component 108 associates (306) a selected set of unique wireless access point IDs with the point of interest based on the comparison (304). For example, the location component 108 may select the set of unique wireless access point IDs that are within a geographic distance of each other. The geographic distance may be a fixed value, or dynamically selected (e.g., based on the number of records, or other factors). As one example, the location component 108 may select a set of unique wireless access point IDs that are within 50 meters of each other for a first point of interest. As another example, the location component 108 may select the set such that the unique wireless access point IDs are within 100 meters and detected during a time period of 10:00 am and 2:00 pm during weekdays for a second "work" point of interest. The location component 108 may identify one or more of the unique wireless access point IDs as being along an outer perimeter of the point of interest (e.g., to simplify calculations for determining entry into the point of interest).

After associating the unique wireless access point IDs with the point of interest, the location component 108 calculates (308) a centroid for the point of interest. In one example, the location component 108 calculates the centroid based on the geographic locations of the set of unique wireless access point IDs associated with the point of interest. In a further example, the location component 108 may weight the geographic locations based on their respective detection counts and/or times of day. The location component 108 may also weight the geographic locations based on their respective received signal strength indications. Additional criteria for calculating the centroid will be apparent to those skilled in the art.

Figure 4:
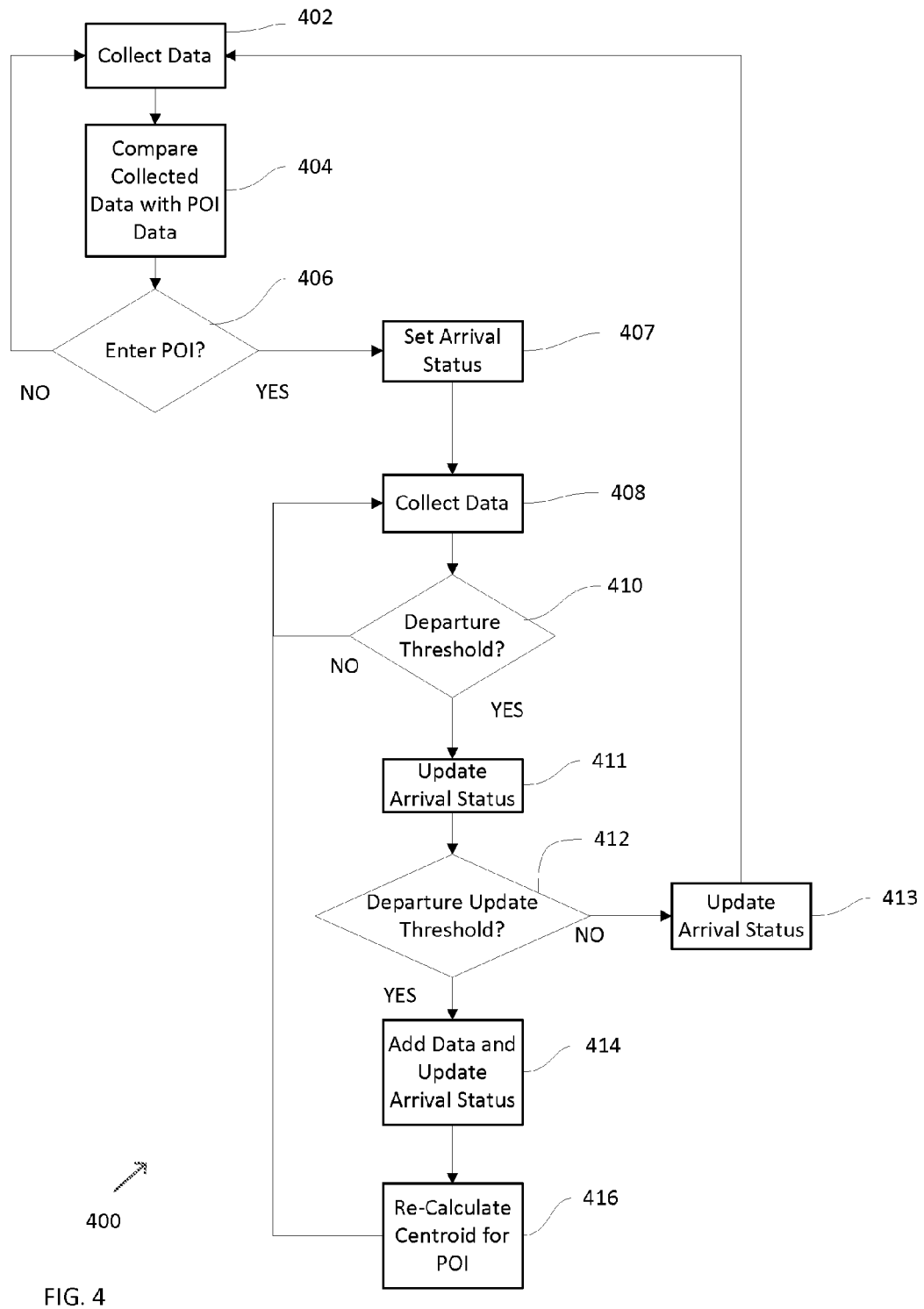
FIG. 4 is a flowchart of a method for updating point of interest data that may be performed by the electronic device of FIG. 1, according to an embodiment.

FIG. 4 is a flowchart of a method for updating point of interest data that may be performed by the electronic device of FIG. 1, according to an embodiment. After the location component 108 has associated the unique wireless access point IDs with a point of interest, the location component 108 collects (402) wireless access point data (e.g. newly detected data from a current scan). The location component 108 compares (404) the collected data from a current scan of unique wireless access point IDs with the set of unique wireless access point IDs associated with the point of interest to determine current intersecting wireless access point IDs. The location component 108 determines (406) whether the electronic device 100 has arrived at the point of interest if a number of current intersecting wireless access point IDs meets an arrival threshold. The arrival threshold may be based on a preselected percentage of a number of associated unique wireless access point IDs for the point of interest (e.g., 20%, 50%, etc.), a fixed number (e.g., 1, 2, 5, etc.), a dynamic threshold based on a confidence level of the record, a received signal strength indicator (RSSI), or a combination thereof. If the location component 108 determines that the arrival threshold is not met (NO at 406), the location component 108 continues to collect (402) data.

If the arrival threshold is met (YES at 406), the location component 108 may set (407) an arrival status (e.g., for the user application 109 or the operating system of the electronic device 100) that indicates that the electronic device 100 has arrived at the point of interest. The location component 108 collects (408) wireless access point data after arrival at the point of interest (e.g., with one or more subsequent scans). The location component 108 compares the subsequent scan of unique wireless access point IDs with the set of unique wireless access point IDs associated with the point of interest to determine (410) whether a number of subsequent intersecting wireless access point IDs meets a departure threshold. The departure threshold may be based on a preselected percentage of a number of associated unique wireless access point IDs for the point of interest (e.g., 20%, 50%, etc.), a fixed number (e.g., 1, 2, 5, etc.), a dynamic threshold based on a confidence level of the record, a received signal strength indicator (RSSI), a detection time, a detection duration, a distance from the centroid, a distance from a unique wireless access point ID of the point of interest, or a combination thereof. One example of a departure threshold is having none of the unique wireless access point IDs detected within three minutes. Another example of the departure threshold is having one unique wireless access point ID detected in the subsequent scan. Yet another example of the departure threshold is having none of the unique wireless access point IDs detected within two minutes and a location of a selected unique wireless access point ID of the subsequent scan being outside a proximity threshold (e.g., 75 meters). The unique wireless access point ID may be selected based on the received signal strength indicator (e.g., a strongest RSSI).

If the departure threshold is not met (NO at 410), the location component 108 continues collecting (408) wireless access point data. If the departure threshold is met (YES at 410), the location component 108 updates (411) the arrival status to indicate that the electronic device 100 has tentatively departed from the point of interest. The location component 108 determines (412) whether a departure update threshold is met. The departure update threshold may be based on a preselected percentage of a number of associated unique wireless access point IDs for the point of interest (e.g., 20%, 50%, etc.), a fixed number (e.g., 1, 2, 5, etc.), a dynamic threshold based on a confidence level of the record, a received signal strength indicator (RSSI), a detection time, a detection duration, a distance from the centroid, a distance from a unique wireless access point ID of the point of interest, or a combination thereof. The departure update threshold indicates that the electronic device 100 has stayed near the point of interest. For example, where the departure threshold is two minutes and 75 meters, the departure update threshold may be five minutes and 75 meters. The location component 108 may also evaluate a speed of the electronic device 100 for the departure update threshold, for example, whether the user of the electronic device 100 is likely to be walking (e.g., more likely to be in the same location) or driving (e.g., less likely to be in the same location).

If the distance between the centroid and the selected wireless access point ID is within the departure update threshold (YES at 412), the location component 108 adds (414) the selected wireless access point ID of the subsequent scan to the set of unique wireless access point IDs associated with the point of interest and updates the arrival status to indicate arrival at the point of interest. After addition of a wireless access point ID, the location component 108 may re-calculate (416) the centroid for the point of interest using the location information associated with the selected wireless access point ID. If the departure update threshold is not met (NO at 412), the location component 108 updates (413) the arrival status to indicate that the electronic device 100 has departed from the point of interest and returns to collect (402) wireless access point data.

The methods of FIGS. 3 and 4 may be applied to multiple points of interest for the electrical device 100. In one example, the location component 108 compares the unique wireless access point IDs for multiple points of interest to determine whether they intersect. The location component 108 may ignore or omit a point of interest if it intersects another point of interest.

It can be seen from the foregoing that a method and system for collecting wireless network data have been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc.

may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

The invention claimed is:

1. A method, on an electronic device, the method comprising:
   collecting data regarding:
      unique wireless access point IDs detected by the electronic device,
      frequencies with which the unique wireless access point IDs are detected, and
      times within a 24 hour cycle of a day at which the unique wireless access point IDs are detected;
   comparing, according to a set of criteria for a point of interest, at least one item of data for one of the unique wireless access point IDs with the at least one item of data for at least one other of the unique wireless access point IDs;
   associating a set of the unique wireless access point IDs with the point of interest based on a result of a comparison; and
   calculating a centroid for the point of interest based on geographic locations of the set of the unique wireless access point IDs associated with the point of interest.

2. The method of claim 1,
   wherein the set of criteria for the point of interest comprises a geographic distance and wherein the associating the set of the unique wireless access point IDs comprises selecting the unique wireless access point IDs that are within the geographic distance of each other.

3. The method of claim 1, wherein the calculating the centroid comprises:
   weighting the geographic locations of the set of the unique wireless access point IDs based on at least one of the frequencies or the times within the 24 hour cycle of the day.

4. The method of claim 1, further comprising:
   collecting data regarding a current scan of the unique wireless access point IDs detected by the electronic device;
   comparing the current scan of the unique wireless access point IDs with the set of the unique wireless access point IDs associated with the point of interest to determine current intersecting wireless access point IDs; and
   determining an arrival of the electronic device at the point of interest if a number of the current intersecting wireless access point IDs meets an arrival threshold.

5. The method of claim 4, further comprising:
   after the determining the arrival, collecting data regarding a subsequent scan of the unique wireless access point IDs detected by the electronic device;

comparing the subsequent scan of the unique wireless access point IDs with the set of the unique wireless access point IDs associated with the point of interest to determine subsequent intersecting wireless access point IDs;

determining if a number of the subsequent intersecting wireless access point IDs meets a departure threshold;

if the number of the subsequent intersecting wireless access point IDs meets the departure threshold, then determining a distance between the centroid for the point of interest and a selected wireless access point ID of the subsequent scan;

if the distance between the centroid and the selected wireless access point ID is within a departure update threshold, then adding the unique wireless access point IDs of the subsequent scan to the set of the unique wireless access point IDs associated with the point of interest; and re-calculating the centroid for the point of interest after the adding.

6. The method of claim 1, wherein:

the collecting the data further comprises collecting received signal strength indications with which the unique wireless access point IDs are detected; and the calculating the centroid comprises weighting the geographic locations of the set of the unique wireless access point IDs associated with the point of interest based on the received signal strength indications.

7. A non-transitory computer-readable medium storing computer code for controlling a processor of an electronic device, the computer code including instructions to cause the processor to:

collect data regarding:
unique wireless access point IDs detected by the electronic device,
frequencies with which the unique wireless access point IDs are detected, and
times within a 24 hour cycle of a day at which the unique wireless access point IDs are detected;

compare, according to a set of criteria for a point of interest, at least one item of data for one of the unique wireless access point IDs with the at least one item of data for at least one other of the unique wireless access point IDs;

associate a set of the unique wireless access point IDs with the point of interest based on a result of a comparison; and calculate a centroid for the point of interest based on geographic locations of the set of the unique wireless access point IDs associated with the point of interest.

8. The non-transitory computer-readable medium of claim 7, wherein the set of criteria for the point of interest comprises a geographic distance, and wherein an instruction, of the instructions, to cause the processor to associate the set of the unique wireless access point IDs comprises an instruction to cause the processor to select the unique wireless access point IDs that are within the geographic distance of each other.

9. The non-transitory computer-readable medium of claim 7, wherein an instruction, of the instructions, to calculate the centroid comprises an instruction to cause the processor to weight the geographic locations of the set of the unique wireless access point IDs based on at least one of the frequencies or the times within the 24 hour cycle of the day.

10. The non-transitory computer-readable medium of claim 7, wherein the instructions further cause the processor to:

collect data regarding a current scan of the unique wireless access point IDs detected by the electronic device;

compare the current scan of the unique wireless access point IDs with the set of the unique wireless access point IDs associated with the point of interest to determine current intersecting wireless access point IDs; and determine an arrival of the electronic device at the point of interest if a number of the current intersecting wireless access point IDs meets an arrival threshold.

11. The non-transitory computer-readable medium of claim 10, wherein the instructions further cause the processor to:

after an instruction, of the instructions, to determine the arrival, collect data regarding a subsequent scan of the unique wireless access point IDs detected by the electronic device;

compare the subsequent scan of the unique wireless access point IDs with the set of the unique wireless access point IDs associated with the point of interest to determine subsequent intersecting wireless access point IDs;

determine if a number of the subsequent intersecting wireless access point IDs meets a departure threshold;

if the number of the subsequent intersecting wireless access point IDs meets the departure threshold, then determine a distance between the centroid for the point of interest and a selected wireless access point ID of the subsequent scan;

if the distance between the centroid and the selected wireless access point ID is within a departure update threshold, then add the unique wireless access point IDs of the subsequent scan to the set of the unique wireless access point IDs associated with the point of interest; and re-calculate the centroid for the point of interest after an instruction, of the instructions, to add the unique wireless access point IDs of the subsequent scan to the set of the unique wireless access point IDs associated with the point of interest.

12. The non-transitory computer-readable medium of claim 7, wherein:

an instruction, of the instructions, to collect the data further comprises an instruction to collect received signal strength indications with which the unique wireless access point IDs are detected; and an instruction, of the instructions, to calculate the centroid comprises an instruction to weight the geographic locations of the set of the unique wireless access point IDs associated with the point of interest based on the received signal strength indications.

13. An electronic device, comprising:

a processor configured to:
collect data regarding:
unique wireless access point IDs detected by the electronic device,
frequencies with which the unique wireless access point IDs are detected, and
times within a 24 hour cycle of a day at which the unique wireless access point IDs are detected;

compare, according to a set of criteria for a point of interest, at least one item of data for one of the unique wireless access point IDs with the at least one item of data for at least one other of the unique wireless access point IDs;

associate a set of the unique wireless access point IDs with the point of interest based on a result of a comparison; and calculate a centroid for the point of interest based on geographic locations of the set of the unique wireless access point IDs associated with the point of interest; and a memory coupled to the processor and configured to store the data.

14. The electronic device of claim 13, wherein the set of criteria for the point of interest comprises a geographic distance and wherein the processor is configured to associate the set of the unique wireless access point IDs by selecting the unique wireless access point IDs that are within the geographic distance of each other.

15. The electronic device of claim 13, wherein the processor is configured to calculate the centroid by weighting the geographic locations of the set of the unique wireless access point IDs based on at least one of the frequencies or the times within the 24 hour cycle of the day.

16. The electronic device of claim 13, wherein the processor is further configured to:

collect data regarding a current scan of the unique wireless access point IDs detected by the electronic device;

compare the current scan of the unique wireless access point IDs with the set of the unique wireless access point IDs associated with the point of interest to determine current intersecting wireless access point IDs; and determine an arrival of the electronic device at the point of interest if a number of the current intersecting wireless access point IDs meets an arrival threshold.

17. The electronic device of claim 16, wherein the processor is further configured to:

after determining the arrival, collect data regarding a subsequent scan of the unique wireless access point IDs detected by the electronic device;

compare the subsequent scan of the unique wireless access point IDs with the set of the unique wireless access point IDs associated with the point of interest to determine subsequent intersecting wireless access point IDs;

determine if a number of the subsequent intersecting wireless access point IDs meets a departure threshold;

if the number of the subsequent intersecting wireless access point IDs meets the departure threshold, then determine a distance between the centroid for the point of interest and a selected wireless access point ID of the subsequent scan;

if the distance between the centroid and the selected wireless access point ID is within a departure update threshold, then add the unique wireless access point IDs of the subsequent scan to the set of the unique wireless access point IDs associated with the point of interest; and re-calculate the centroid for the point of interest after adding the unique wireless access point IDs of the subsequent scan to the set of the unique wireless access point IDs associated with the point of interest.

18. The electronic device of claim 13, wherein the processor is configured to:

collect the data by collecting received signal strength indications with which the unique wireless access point IDs are detected; and calculate the centroid by weighting the geographic locations of the set of the unique wireless access point IDs associated with the point of interest based on the received signal strength indications.

* * * * *